United States Patent [19]

Wiser

[11] 3,979,194

[45] Sept. 7, 1976

[54] DUST FILTER

[76] Inventor: Abram J. Wiser, 1436 N. Tenth St., Enid, Okla. 73701

[22] Filed: Mar. 4, 1975

[21] Appl. No.: 555,103

Related U.S. Application Data

[63] Continuation of Ser. No. 458,299, April 5, 1974, abandoned.

[52] U.S. Cl. .................................. 55/296; 55/337; 55/385 F; 55/423; 55/430; 55/466; 55/498
[51] Int. Cl.² ........................................ B01D 46/04
[58] Field of Search ............ 55/296, 337, 423, 430, 55/385, 466, 498, DIG. 20; 209/390

[56] References Cited
UNITED STATES PATENTS

| | | | |
|---|---|---|---|
| 356,243 | 1/1887 | Elkins | 55/DIG. 20 |
| 409,025 | 8/1889 | Downton | 55/296 |
| 575,824 | 1/1897 | Case | 55/430 X |
| 689,299 | 12/1901 | Germains | 55/DIG. 20 |
| 817,797 | 4/1906 | Ogan | 55/385 |
| 883,791 | 4/1908 | Dempster | 55/423 |
| 1,130,725 | 3/1915 | Getts | 55/296 UX |
| 1,136,953 | 4/1915 | Graffenberger | 55/430 |
| 2,228,919 | 1/1941 | Crabb | 55/430 X |
| 2,405,129 | 8/1946 | Bible | 55/296 |
| 2,886,900 | 5/1959 | Flannery | 55/296 X |
| 3,221,479 | 12/1965 | Moser et al. | 55/296 |
| 3,349,911 | 10/1967 | Reddick | 209/390 X |

*Primary Examiner*—Frank W. Lutter
*Assistant Examiner*—Kathleen J. Prunner
*Attorney, Agent, or Firm*—Raymond N. Matson

[57] ABSTRACT

An efficient unit for placement on the exhaust cylinder of a dust collector, etc., the unit having a cylindrical filter through which the air passes and deposits dust thereon, the latter being removed by brushes for gravity deposit in an annular trough through which a scraper passes to move the dust particles to an exhaust tube.

1 Claim, 5 Drawing Figures

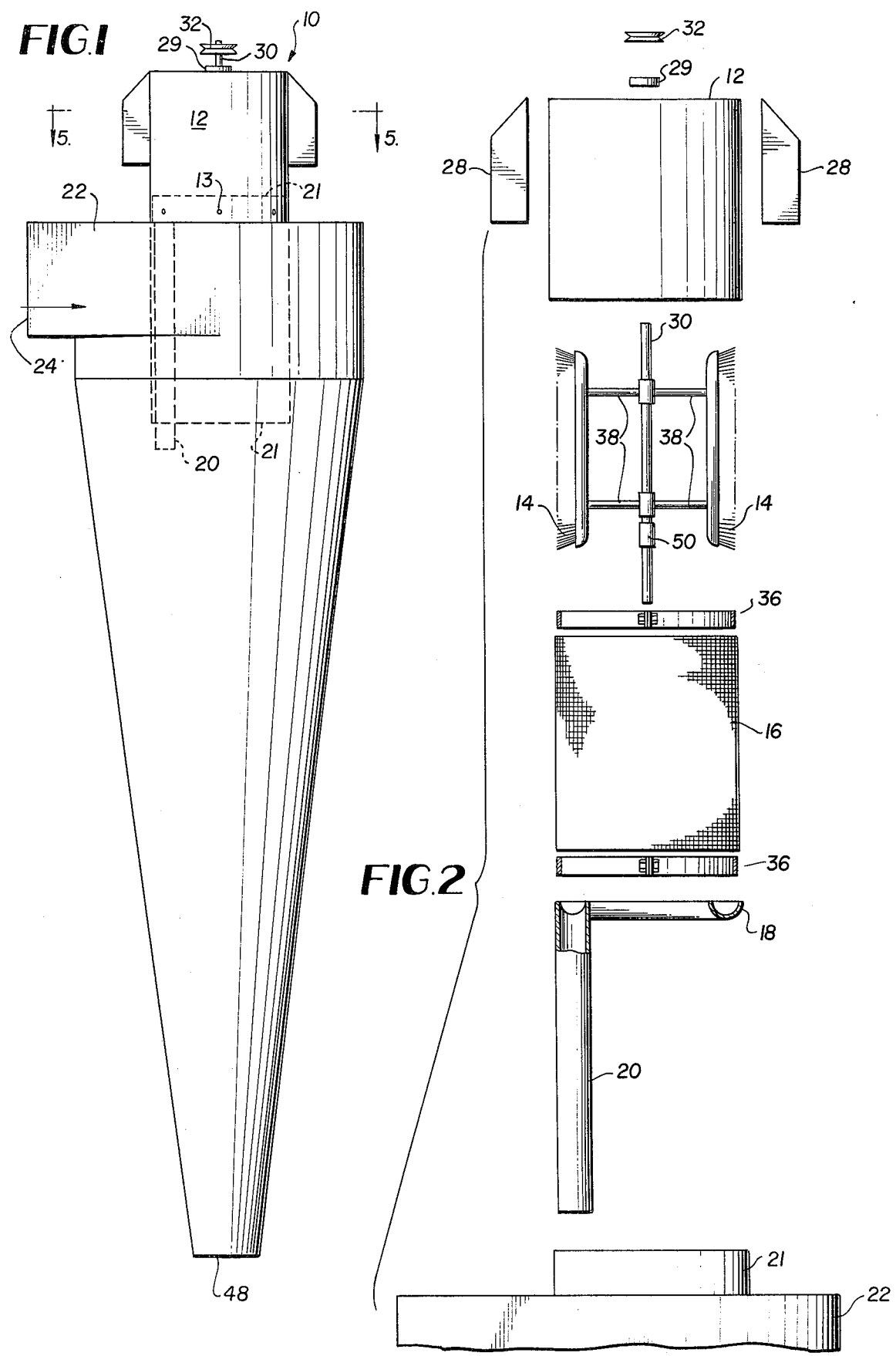

DUST FILTER

This is a continuation of application Ser. No. 458,299 filed Apr. 5, 1974 now abandoned.

This invention relates generally to dust filters and more particularly to an improved unit for efficiently removing the large dust particles and chaff still present in the exhaust of existing apparatus.

Dust filters are well known in the art and take many different forms among which are the centrifugal type in which the heavier dust particles are intended to drop therefrom into a collector. However, the lighter particles often pass with the exhaust air into the atmosphere to add to the pollution problem.

Accordingly, the main object of the present invention is to provide an improved dust filter unit for removing small and large dust particles from gases or the air.

An important object of the present invention is to provide an improved dust filter unit which may be readily attached to conventional air cleaners so as to enable them to meet any State or Federal dust pollution standards.

Another important object of the present invention is to provide an improved dust filter unit which is self cleaning and collects dust without the use of centrifugal forces.

A further important object of the present invention is to provide an improved dust filter unit which is lightweight, efficient and inexpensive in cost.

A still further important object of the present invention is to provide an improved dust filter unit which is susceptible of ready and economical manufacture and which is strong, rugged and of long life in use.

Other objects and advantages of the invention will become apparent during the course of the following description.

In the drawings, there is shown one embodiment of the invention. In this showing:

FIG. 1 is a side elevational view of the dust filter unit comprising the present invention mounted on the exhaust cylinder of a cyclone type dust collector;

FIG. 2 is an exploded view thereof;

Figure 3:
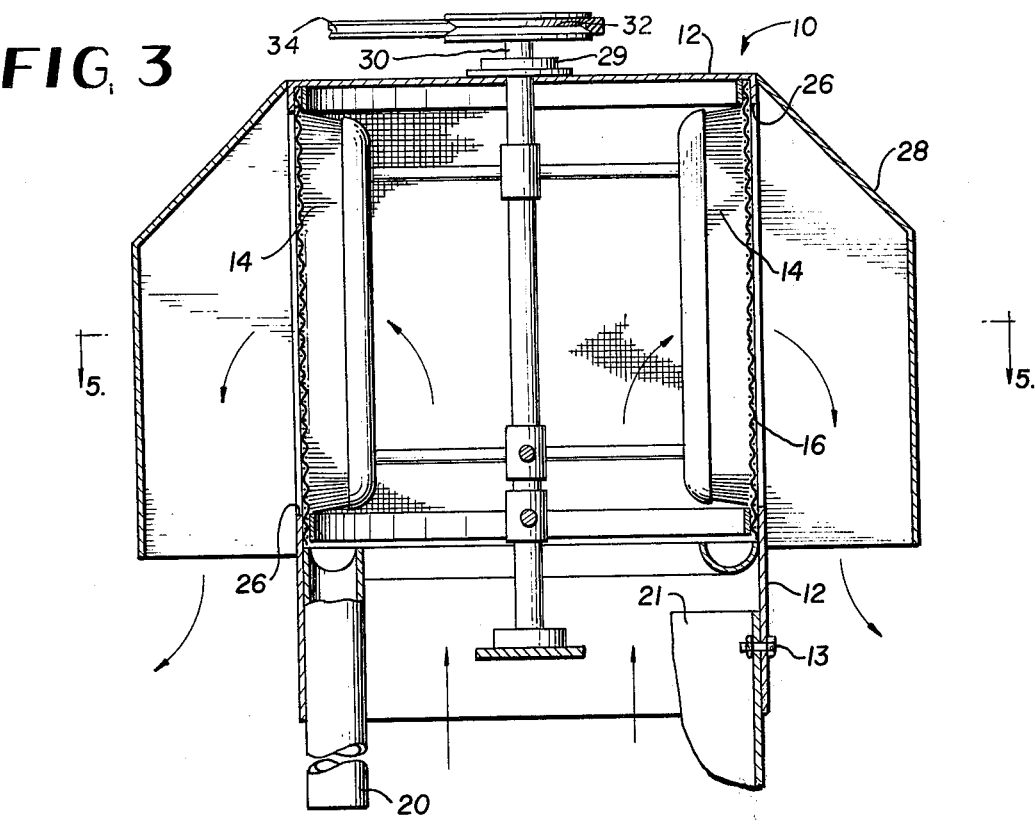
FIG. 3 is a central vertical sectional view thereof to an enlarged scale.

Referring to the drawings, numeral 10 designates the dust filter unit as a whole which comprises a cylindrical housing 12 open at its bottom, a pair of elongated filter cleaning brushes 14, a cylindrical filter unit 16, and a dust collecting trough 18 having a dust discharge pipe 20 depending therefrom.

While dust laden air or gases may be passed axially upward through the cylindrical housing 12 of the unit 10 which may be used by itself to effect an efficient cleaning thereof, the only inlet of the unit 10 is disclosed as mounted by bolts 13 on the exit or discharge cylinder 21 of an existing dust collector 22. This is of the cyclone type and has an inlet 24 and the dust discharge opening 21 from which any externally protruding air outlet rain hood has been removed.

The filter housing 12 has diametrically opposed openings 26 formed therein for the complete exhausting of the filtered air and these openings are of substantial width, extend downwardly more than half the height of said housing, and are protected against rain, etc. by removable hoods 28 (FIG. 2). Projecting centrally above the top of the cylinder 12 and rotatably mounted therein by a sealed bearing 29 is a depending steel shaft 30 which is rotated by means of a gear or pulley 32 by a chain or belt 34 which is driven by a suitable electric motor (not shown).

Figure 4:
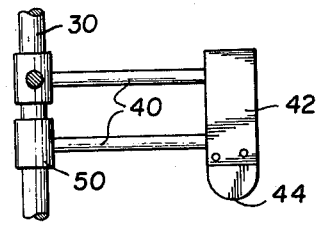
FIG. 4 is a fragmentary elevational view of the scraper and its mounting.
Figure 5:
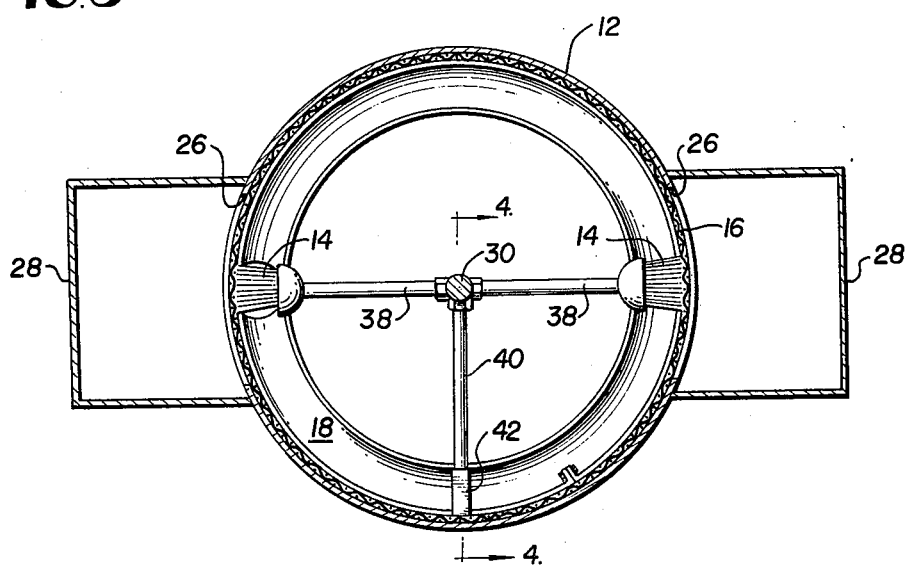
FIG. 5 is a horizontal sectional view showing the brushes, the scraper, and the scraper trough.

The filter unit 16 is fixed to the inner side of the housing 12 by means of clamps 36 and the brushes 14 which rotate against the inner face of the filter unit 16 are mounted on pairs of vertically spaced, diametrically opposed radially extending arms 38 fixed to the shaft 30. At right angles to the arms 38 (FIGS. 4 and 5), are a pair of vertically spaced radially extending arms 40 which support a scraper bar 42 having a rounded lower end 44 which conforms with and moves in the trough 18. The scraper bar 42 collects dust particles which are brushed from the filter element 16 by the brushes 14 and fall into the semicircular trough 18 fixed to the lower end of the housing 12. The dust particles then fall into the discharge pipe 20 to a point below the end of cyclone exhaust cylinder 21 where they have a better chance to centrifuge out.

It will now be apparent that when the dust filter unit 10 is mounted on an air exhaust cylinder or, as shown, on the exhaust cylinder 21 of any shape of a cyclone type dust collector, that the dust-laden air enters the cyclone by inlet 24 as shown by the arrows, and the dust follows the normal centrifugal pattern with the heavier particles moving to the outside and falling down through the dust exit 48. The lighter particles move upwardly through the cyclone air exhaust cylinder 21 and pass through the filter unit 16 and out to the atmosphere through the openings 26 and hoods 28, as indicated by the arrows (FIG. 3).

The dust particles which are trapped on the inner side of the filter element 16 are brushed off by the two brushes 14 which are rotated therewithin by the motor and falls into the semi-circular trough 18 along which it is moved by the scraper bar 42 to the discharge pipe 20. The vertical position of the brushes or the scraper is readily adjusted on the supporting motor driven shaft 40 by means of a shaft collar 50 having positioning lock screws (not shown). It will be appreciated that the external configurations of the cyclone exhaust cylinder 21 and the bottom of the housing 12, or of the trough 18 and the scraper, is immaterial as long as they are compatible.

It is to be understood that the form of my invention herewith shown and described is to be taken as a preferred example of the same and that various changes in the shape, size and arrangement of parts may be resorted to without departure from the spirit of the invention or the scope of the subjoined claims.

I claim:

1. A dust filter to be mounted on the upper end of an air exhaust pipe comprising, in combination, a circular wall defining an impervious tubular housing having an open bottom inlet for the axial reception of exhaust air and means for attaching it to the upper end of an exhaust pipe; said housing having a closed top and diametrically opposed lateral exhaust outlets formed in the side thereof adjacent to the top; said outlets being of substantial width and extending downwardly more than half of the height of said housing; a tubular filter unit mounted in said housing and covering said lateral exhaust outlets so as to filter dust particles from the air being exhausted therethrough; a power driven shaft rotatably mounted in the top of said housing and depending concentrically therefrom; a pair of brushes vertically coextensive with said filter unit mounted on said shaft for rotation therewith and engaging the inner surface of said filter to brush therefrom dust particles which are deposited by air passing vertically through said open bottom inlet and laterally out of said exhaust outlets; filtered dust particle collecting means concentric and radially coextensive with said filter comprising an annular trough fixed to the inside bottom portion of said circular wall of said housing and encircling said air inlet; a dust outlet pipe connected to said trough and a dust particle scraper fixed to said shaft and conforming with and movable in said trough to move collected dust particles to said dust outlet pipe; and a hood fixed to and projecting outwardly of said housing over each of said entire exhaust outlets to exclude rain from within said housing.

* * * * *